United States Patent
Tseng (10) Patent No.: US 9,144,847 B2
(45) Date of Patent: Sep. 29, 2015

(54) CUTTER ASSEMBLY

(71) Applicant: MIYANACH IND. CO., LTD., Changhwa Hsien (TW)

(72) Inventor: Yung-Teng Tseng, Changhwa Hsien (TW)

(73) Assignee: MIYANACH IND. CO., LTD., Changhwa Hsien (TW)

( * ) Notice: Subject to any disclaimer, the term of this patent is extended or adjusted under 35 U.S.C. 154(b) by 291 days.

(21) Appl. No.: 13/793,980

(22) Filed: Mar. 11, 2013

(65) Prior Publication Data

US 2014/0255117 A1  Sep. 11, 2014

(51) Int. Cl.
*B23B 31/06* (2006.01)
*B23B 51/04* (2006.01)
*B23B 31/107* (2006.01)

(52) U.S. Cl.
CPC ......... *B23B 51/0473* (2013.01); *B23B 31/1071* (2013.01); *B23B 51/0426* (2013.01); *Y10T 279/17752* (2015.01); *Y10T 279/3481* (2015.01); *Y10T 408/895* (2015.01); *Y10T 408/953* (2015.01)

(58) Field of Classification Search
CPC .. B23B 51/0473; B23B 31/008; B23B 31/06; B23B 31/1071
USPC .......... 408/204, 206, 238, 239 R; 279/74, 75, 279/82, 904, 905, 155
See application file for complete search history.

(56) References Cited

U.S. PATENT DOCUMENTS

| 3,985,368 | A  | * | 10/1976 | Better et al. ..................... 279/75 |
| 6,250,856 | B1 | * | 6/2001  | Miyanaga ....................... 408/57 |
| 2007/0160435 | A1 | * | 7/2007 | Chao ............................. 408/102 |
| 2009/0279971 | A1 | * | 11/2009 | O'Keefe et al. ............... 408/204 |

FOREIGN PATENT DOCUMENTS

DE  20113578 U1 * 10/2001

* cited by examiner

*Primary Examiner* — Daniel Howell
*Assistant Examiner* — Yasir Diab
(74) *Attorney, Agent, or Firm* — Ming Chow; Sinorica, LLC (57) ABSTRACT

A cutter assembly has an adapter, an outer collar, a recoil spring, a head, a pushing assembly and a central drill. The adapter has an L-shaped guiding slot and multiple balls. The outer collar is slidably and rotatably mounted around the adapter and has an annular protrusion and a positioning rod. The annular protrusion selectively abuts against the balls. The positioning rod is mounted on the outer collar and extends slidably into the guiding slot. The head is mounted detachably on the adapter and has a saw and an inserting rod. The inserting rod is inserted into the adapter and has an annular engaging groove. The annular engaging groove is formed around the inserting rod at a position corresponding to the balls to selectively hold the balls in the engaging groove.

11 Claims, 7 Drawing Sheets

CUTTER ASSEMBLY

BACKGROUND OF THE INVENTION

1. Field of the Invention

The present invention relates to a cutter assembly, and more particularly to a cutter assembly that can be replaced with a new head quickly in a safe way.

2. Description of Related Art

Figure 8:
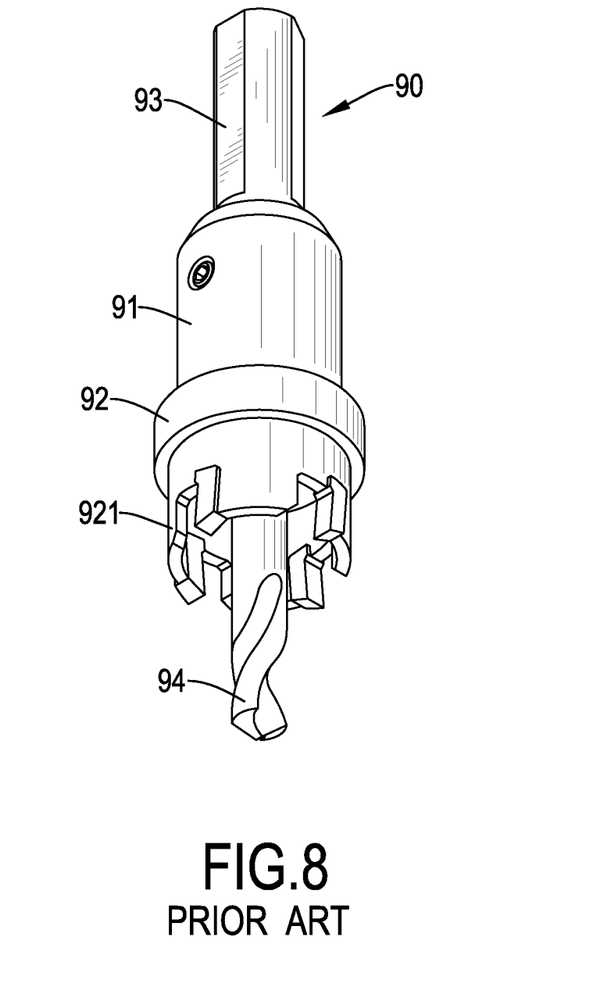
FIG. 8 is a perspective view of a conventional cutter assembly in accordance with the prior art.

With reference to FIG. 8, a cylindrical cutter is used to drill a through hole in a material such as a metal plate when the diameter of the hole required is too great for the available drill bits. A conventional cylindrical cutter 90 comprises a cylindrical adapter 91 and a central drill 94. The adapter 91 has a connecting rod 93 and a head 92 formed respectively on two ends of the adapter 91. The connecting rod 93 is connected to and has three clamped surfaces formed on the connecting rod to be clamped by a clamping device of a rotating machine such as an electric drill. Accordingly, the cylindrical cutter is actuated and rotated by the rotating machine. A cylindrical saw 921 is integrally formed around the bottom of the head 92 to drill a through hole in a material such as a metal plate. The central drill 94 is detachably mounted in the bottom of the adapter 91 and extends out from the saw 921.

However, because the saw 921 is integrally formed on the head 92 of the adapter 91, another cutter assembly with a saw having a different diameter is needed when a through hole with a different diameter is to be cut which involves excessive stocks if a user is to be prepared for different work pieces. To detach the cutter assembly from the rotating machine, the clamping device has to be released with tools. When a new cutter assembly is attached to and clamped by the clamping device, the clamping device has to be locked with tools. Therefore, to replace the conventional cutter assembly with a new one takes time and is laborious.

Furthermore, during the process of replacing the conventional cutter assembly, tools, the detached cutter assembly and the new cutter assembly have to be held by the user such that these components easily fall off from the user to cause injury to the user.

To overcome the shortcomings, the present invention tends to provide a cutter assembly to mitigate or obviate the aforementioned problems.

SUMMARY OF THE INVENTION

The main objective of the invention is to provide a cutter assembly that be replaced with a new head quickly in a safe way.

The cutter assembly in accordance with the present invention has an adapter, an outer collar, a recoil spring, a head, a pushing assembly and a central drill.

The adapter has two ends, a connecting rod, an inserting hole, a sleeve segment, a guiding slot, multiple ball holes, multiple balls and at least one holding tab. The connecting rod is formed on one end of the adapter, and the inserting hole defined in the other end of the adapter opposite to the connecting rod. The sleeve segment is formed around the inserting hole and having an outer surface. The guiding slot is defined in the outer surface of the sleeve segment and has a limiting segment and a sliding segment. The limiting segment is formed laterally in the outer surface of the sleeve segment. The sliding segment is formed longitudinally in the outer surface of the sleeve segment and is connected and communicates with the limiting segment. The ball holes are defined through the outer surface of the sleeve segment and communicate with the inserting hole, and each ball hole is conical and has a minimum diameter. The balls are mounted respectively in the ball holes, and each ball has a maximum diameter larger than the minimum diameter of a corresponding one of the ball holes. The at least one holding tab is formed on and protrudes from the adapter at the end in which the inserting hole is defined. The outer collar is slidably and rotatably mounted around the sleeve segment of the adapter and has an inner surface, an annular protrusion, an escaping recess and a positioning rod. The annular protrusion is formed on and protrudes from the inner surface of the outer collar and selectively abuts against the balls. The escaping recess is annular, is formed in the inner surface of the outer collar adjacent to the annular protrusion and selectively aligns with the ball holes. The positioning rod is mounted on the outer collar and extends slidably into the guiding slot. The recoil spring is mounted between the adapter and the outer collar and is mounted around the sleeve segment of the adapter. The holding ring is mounted around the sleeve segment of the adapter and abuts the outer collar to hold the outer collar on the sleeve segment of the adapter. The head is mounted detachably on the adapter and has two ends, a saw and an inserting rod. The saw is formed around one of the ends of the head. The inserting rod is formed on and protrudes from the other end of the head, is inserted into the inserting hole in the adapter and has an annular engaging groove and at least one holding surface. The annular engaging groove is formed around the inserting rod at a position corresponding to the balls to selectively hold the balls in the engaging groove. The at least one holding surface is formed on the inserting rod and abuts respectively the at least one holding tab on the adapter.

Other objects, advantages and novel features of the invention will become more apparent from the following detailed description when taken in conjunction with the accompanying drawings.

DETAILED DESCRIPTION OF PREFERRED EMBODIMENT

Figure 1:
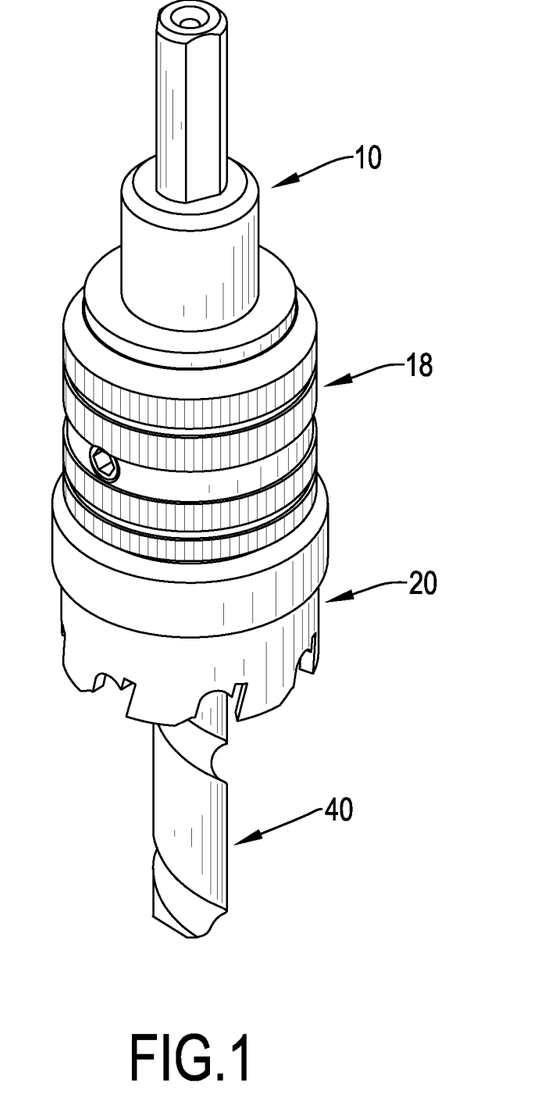
FIG. 1 is a perspective view of a first embodiment of a cutter assembly in accordance with the present invention.
Figure 2:
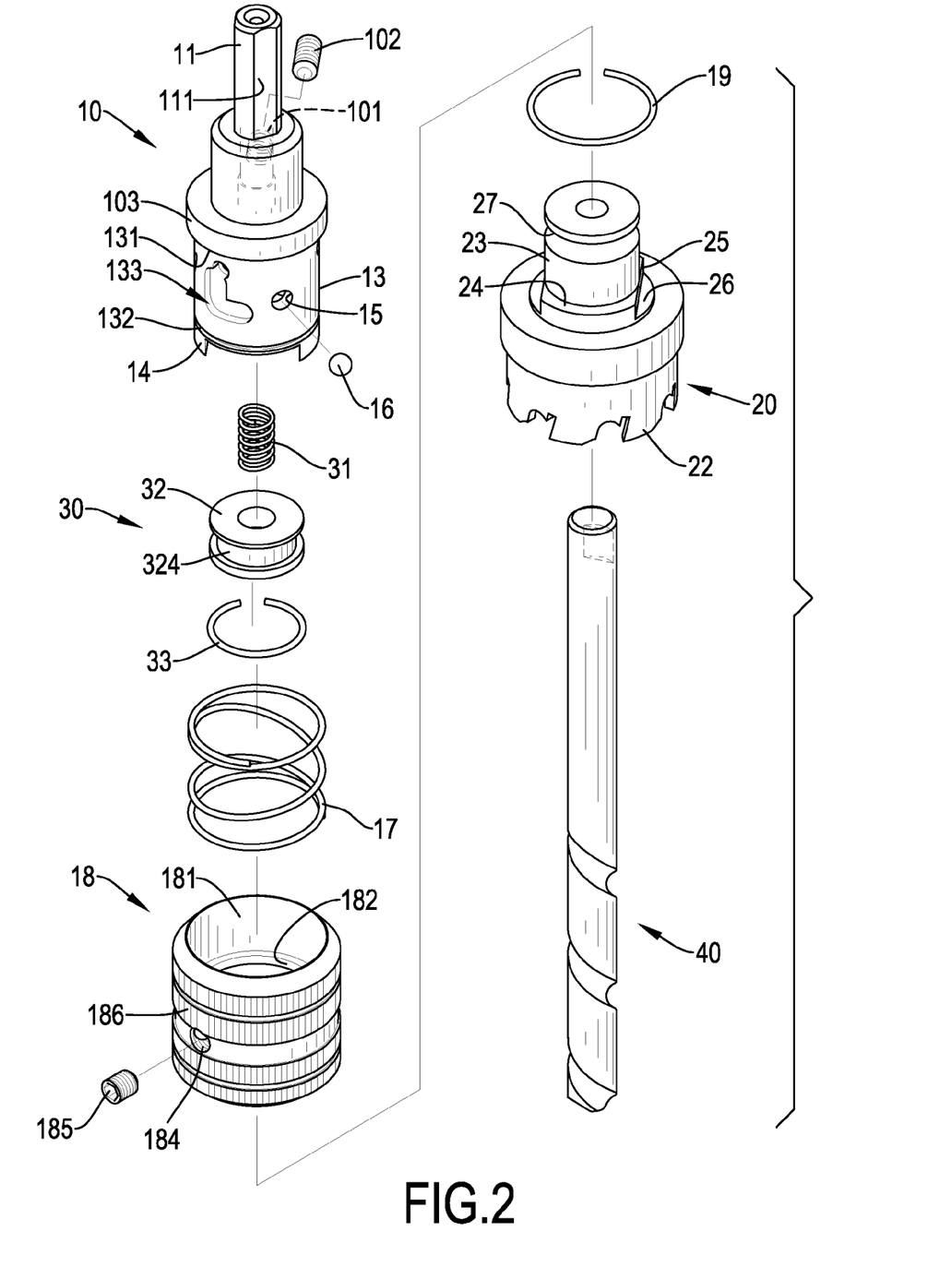
FIG. 2 is an exploded perspective view of the cutter assembly in FIG. 1.
Figure 3:
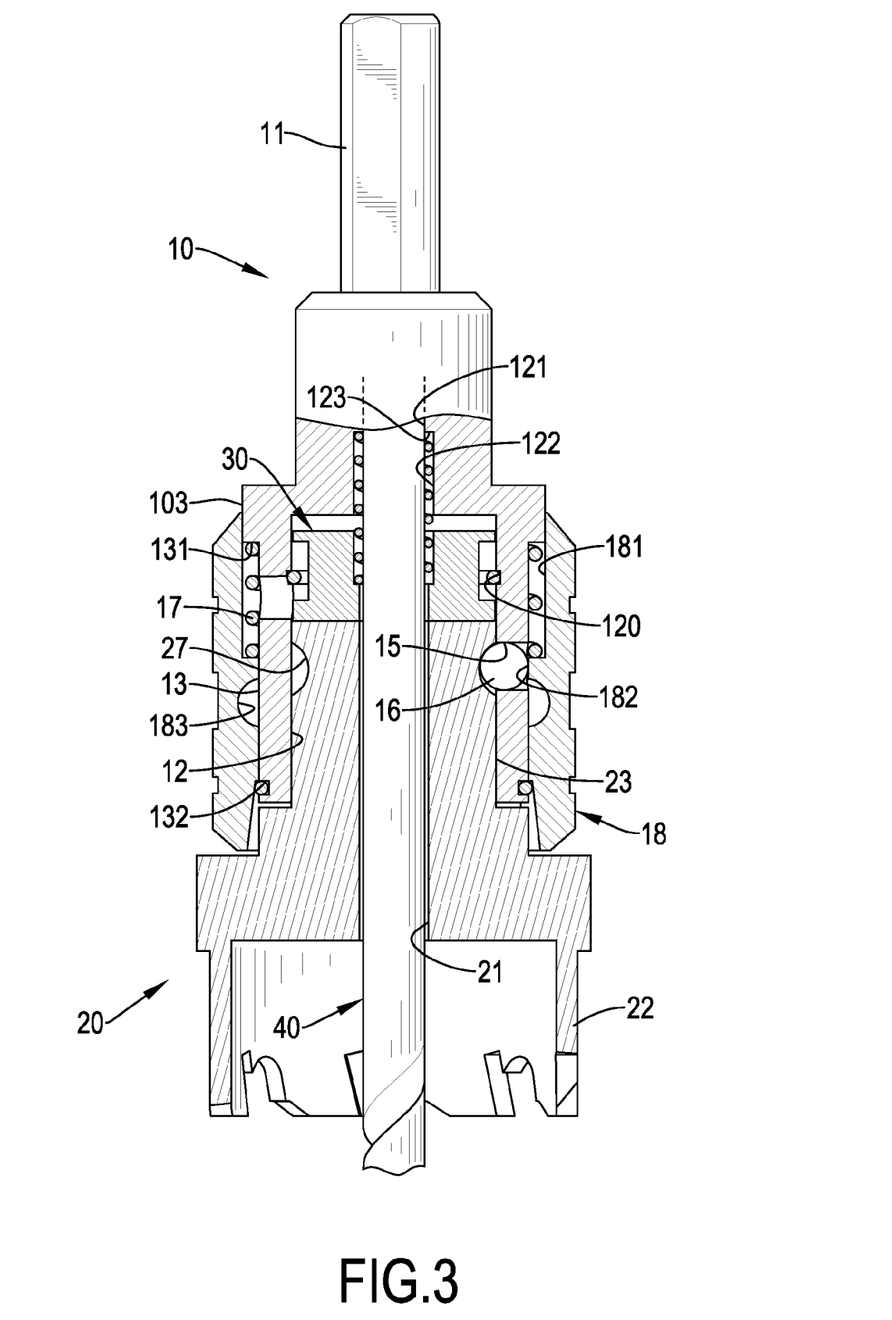
FIG. 3 is an enlarged side view in partial section of the cutter assembly in FIG. 1.

With reference to FIGS. 1 to 3, a cutter assembly in accordance with the present invention comprises an adapter 10, an outer collar 18, a recoil spring 17, a head 20, a pushing assembly 30 and a central drill 40.

The adapter 10 has two ends, a connecting rod 11, an inserting hole 12, a central hole 121, a sleeve segment 13, a flange 103, a guiding slot 133, at least one holding tab 14, multiple ball holes 15 and multiple balls 16. The connecting rod 11 and the inserting hole 12 are formed respectively on two ends of the adapter 10. The connecting rod 11 is formed on one end of the adapter 10 and has three clamping surfaces 111 formed on the connecting rod 11 at even intervals, such that the connecting rod 11 can be clamped securely with a clamping device of a rotating machine via the clamping surfaces 111. The inserting hole 12 is defined in the other end of the adapter 10 opposite to the connecting rod 11. The central hole 121 is defined in the adapter 10 and co-axially communicates with the inserting hole 12. In addition, an enlarged hole 122 is formed on an end of the central hole 121 that is adjacent to the inserting hole 12, such that an abutting shoulder 123 is formed between the central hole 121 and the enlarged hole 122.

The sleeve segment 13 is formed around the inserting hole 12 and has a ring groove 132 defined around the sleeve segment 13 at a position adjacent to the end of the adapter 10 in which the inserting hole 12 is defined. The flange 103 is formed around the sleeve segment 13 and has an outer diameter larger than an outer diameter of the sleeve segment 13 to form an abutting shoulder 131 between the flange 103 and the sleeve segment 13.

Figure 5:
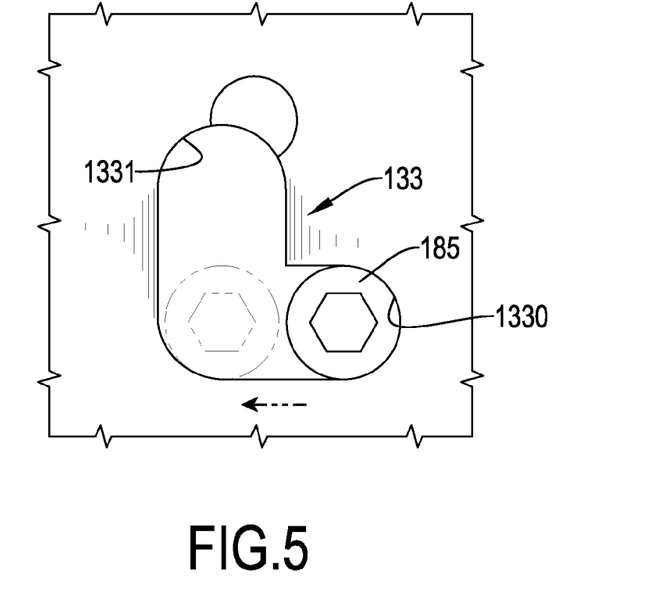
FIG. 5 is an enlarged operational side view of the cutter assembly in FIG. 1 showing that the positioning rod slides along the limiting segment of the guiding slot.
Figure 6:
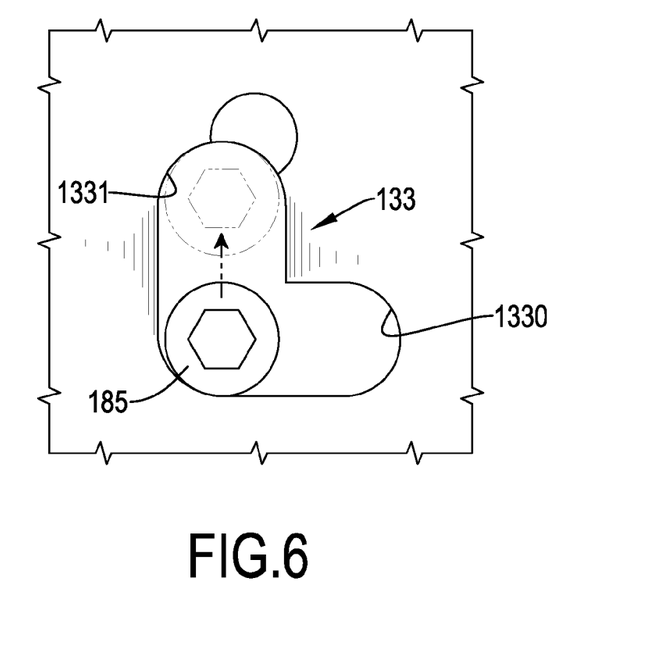
FIG. 6 is another enlarged operational side view of the cutter assembly in FIG. 1 showing that the positioning rod slides along the sliding segment of the guiding slot.

With reference to FIGS. 2, 5 and 6, the guiding slot 133 is defined in the outer surface of the sleeve segment 13 between the flange 103 and the ring groove 132 and comprises a limiting segment 1330 and a sliding segment 1331. The limiting segment 1330 is formed laterally in the outer surface of the sleeve segment 13. The sliding segment 1331 is formed longitudinally in the outer surface of the sleeve segment 13 and is connected and communicates with the limiting segment 1330 to make the guiding slot 13 L-shaped.

The at least one holding tab 14 is formed on and protrudes from the adapter 10 at the end in which the inserting hole 12 is defined. Preferably, two holding tabs 14 are implemented. The ball holes 15 are defined through the outer surface of the sleeve segment 13 and communicate with the inserting hole 12. Each ball hole 15 is conical and has a minimum diameter. The balls 16 are mounted respectively in the ball holes 15, and each ball 16 has a maximum diameter larger than the minimum diameter of a corresponding one of the ball holes 15. Preferably, three ball holes 15 and three balls 16 are implemented. Furthermore, the adapter 10 further has an annular ring groove 120 defined in an inner surface of the inserting hole 12 between the enlarged hole 122 and the ball holes 15.

The outer collar 18 is slidably and rotatably mounted around the sleeve segment 13 of the adapter 10 and has a holding hole 181, an annular protrusion 182, an escaping recess 183 and a positioning rod 185. The holding hole 181 is defined in the outer collar 18 and has an inner diameter larger than the outer diameter of the flange 103 on the adapter 10. The annular protrusion 182 is formed on and protrudes from the inner surface of the outer collar 18 and selectively abuts against the balls 16. With the arrangement of the annular protrusion 182, the balls 16 can be pushed to extend partially out of the ball holes 15 and into the inserting hole 12. The escaping recess 183 is annular, is formed in the inner surface of the outer collar 18 adjacent to and below the annular protrusion 182 and selectively aligns with the ball holes 15. When the outer collar 18 is moved relative to the adapter 10 and the escaping recess 183 can align with the ball holes 15, the balls 16 will enter partially into the escaping recess 183.

The positioning rod 185 is mounted on the outer collar 18 and extends slidably into the guiding slot 133. In the preferred embodiment, a threaded hole 184 is defined in the outer collar 18, communicates with the holding hole 181 and corresponds to the guiding slot 133 in position. The positioning rod 185 is threaded and is mounted in the threaded hole 184. When the positioning rod 185 is mounted in the limiting segment 1330 of the guiding slot 133, the outer collar 18 is prevented from moving upward or downward relative to the adapter 10. Consequently, the outer collar 18 can be kept from being pushed to move longitudinally relative to the adapter 10 unintentionally, such that a safety effect is provided. When the outer collar 18 is rotate relative to the adapter 10, the positioning rod 185 will move along the limiting segment 1330 and to the sliding segment 1331. Then, the outer collar 18 can be moved upward or downward relative to the adapter 10. To conveniently rotate and move the outer collar 18, the outer collar 18 has an engraved outer surface 186.

A holding ring 19 is mounted around the sleeve segment 13 of the adapter 10, is mounted in the ring groove 132 and abuts the outer collar 18 to hold the outer collar 18 on the sleeve segment 13 of the adapter 10.

The recoil spring 17 is mounted between the adapter 10 and the outer collar 18, is mounted around the sleeve segment 13 of the adapter 10 and has an outer diameter smaller than the inner diameter of the holding hole 181. Two ends of the recoil spring 17 respectively abut the flange 103 and the annular protrusion 182 to push the outer collar 18 to abut with the holding ring 19.

With reference to FIGS. 2 and 3, the head 20 is mounted detachably on the adapter 10, is cylindrical and comprises a central through hole 21, a saw 22 and an inserting rod 23. The central through hole 21 is defined axially through the head 20. The saw 22 is formed around one of the ends of the head 20 and around the central through hole 21. The inserting rod 23 is formed on and protrudes from the other end of the head 20, is inserted into the inserting hole 12 in the adapter 10 and has an outer diameter smaller than that of the head 20. Thus, a shoulder 24 is formed between the inserting rod 23 and the end of the head 20 on which the inserting rod 23 is formed and abuts one end of the adapter 10 in which the inserting hole 12 is defined. At least one holding surface 25 is formed on the inserting rod 23 and abuts respectively the at least one holding tab 14 on the adapter 10. At least one holding notch 26 is defined in the shoulder 24 to respectively hold and abut the at least one holding tab 14.

With reference to FIGS. 2 and 3, an annular engaging groove 27 is formed around the inserting rod 23 at a position corresponding to the balls 16 to selectively hold the balls 16 in the engaging groove 27. With the engagement of the balls 16 and the engaging groove 27, the head 20 can be securely combined with the adapter 10.

Figure 4:
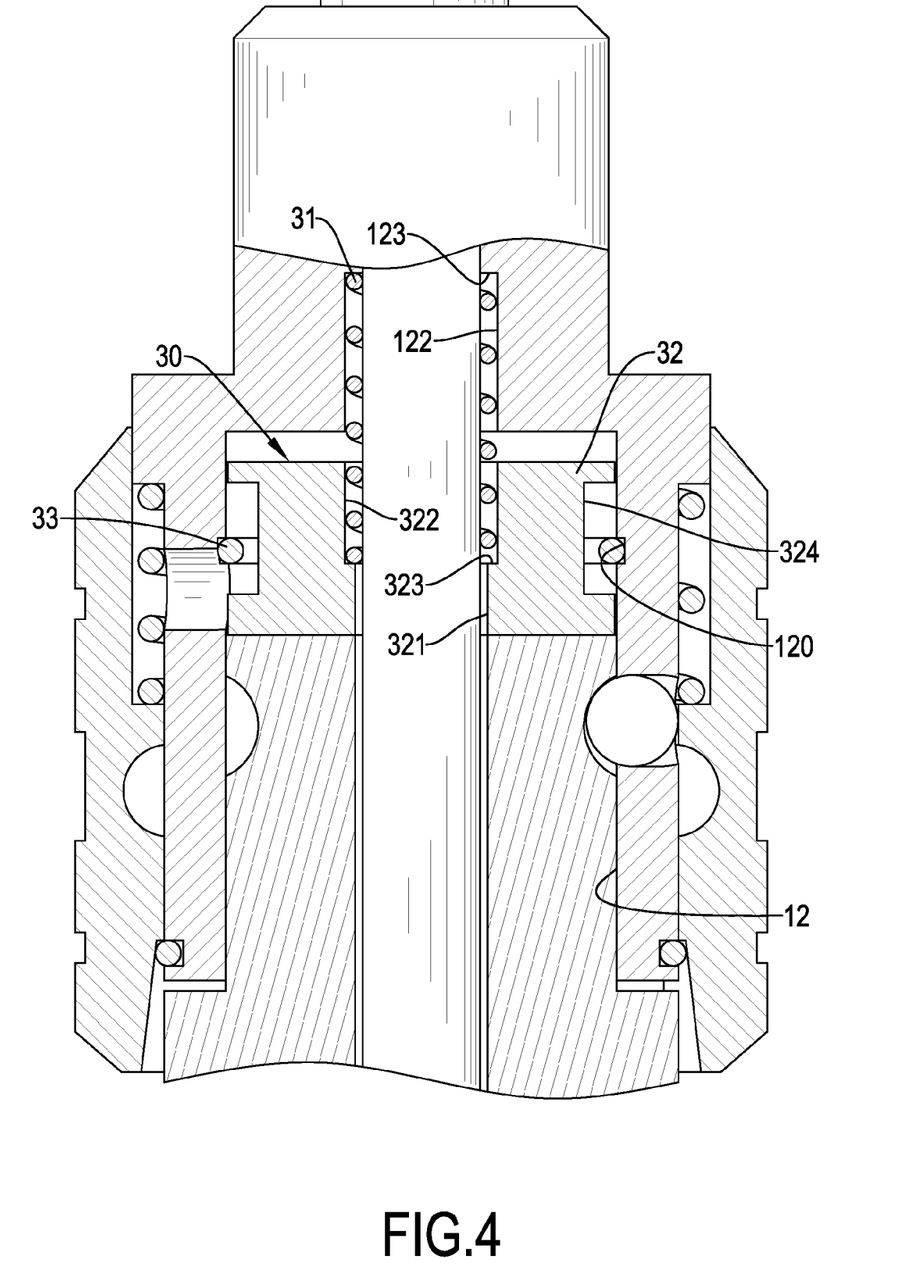
FIG. 4 is an enlarged side view in partial section of the cutter assembly in FIG. 3.

With reference to FIGS. 2 and 4, the pushing assembly 30 is mounted between the adapter 10 and the head 20, pushes against the head 20 axially and comprises a pushing block 32, a pushing spring 31 and a limiting ring 33. The pushing block 32 is mounted moveably in the inserting hole 12, abuts the head 20 and has a central hole 321 defined through the pushing block 32, an enlarged hole 322 and a limiting recess 324. The enlarged hole 322 is formed in a side of the pushing block 32 facing the central hole 121 in the adapter 10 and communicates with the central hole 321 to define an abutting shoulder 323 between the enlarged hole 322 and the central hole 321. The limiting recess 324 is annular and is defined around the pushing block 32.

The pushing spring 31 has two ends abutting respectively the adapter 10 and the pushing block 32. In the preferred embodiment, the two ends of the pushing spring 31 are mounted respectively in the enlarged holes 122,322 of the adapter 10 and the pushing block 32 and abut respectively the abutting shoulders 123,323 on the adapter 10 and the pushing block 32.

The limiting ring 33 is mounted in the inserting hole 12 and around the pushing block 32 to provide a limiting effect to the movement range of the pushing block 32. In the preferred embodiment, the limiting ring 33 is mounted in and protrudes from the ring groove 120 and extends partially in the limiting recess 324 of the pushing block 32. Accordingly, when the pushing block 32 is moved, the movement range of the pushing block 32 will be limited by the limiting ring 33 selectively abutting with an upper edge or a lower edge of the limiting recess 324 in the pushing block 32.

The central drill 40 is mounted through the central through hole 21 in the head 20, extends into the central hole 121 in the adapter 10 via the inserting hole 12 and is mounted through the central hole 321 of the pushing block 32.

With reference to FIGS. 1 to 3, the cutter assembly in accordance with the present invention can be clamped with a clamping device of a rotating machine by the clamping surfaces 111 on the connecting rod 11. To replace a head 20 having a saw 22 of different size or shape, with reference to FIGS. 1 and 5 to 7, the outer collar 18 is rotated relative to the adapter 10 until the positioning rod 185 moves into the sliding segment 1331 of the guiding slot 133. The outer collar 18 is moved upward relative to the adapter 10 and the recoil spring 17 is compressed. With the movement of the outer collar 18, the annular protrusion 182 will move away from the position where the annular protrusion 182 abuts the balls 16, and the escaping recess 183 will move to the position where the escaping recess 183 aligns with the balls 16. Accordingly, the balls 16 will move out of the engaging groove 27 in the inserting rod 23 of the head 20 and enter into the escaping recess 183. Thus, the locking effect provided to the head 20 by the balls 16 can be released, and the head 20 will be pushed to move outward from the inserting hole 12 by the pushing block 32 and the pushing spring 31. Therefore, the head 20 can be quickly and conveniently detached from the adapter 10.

Figure 7:
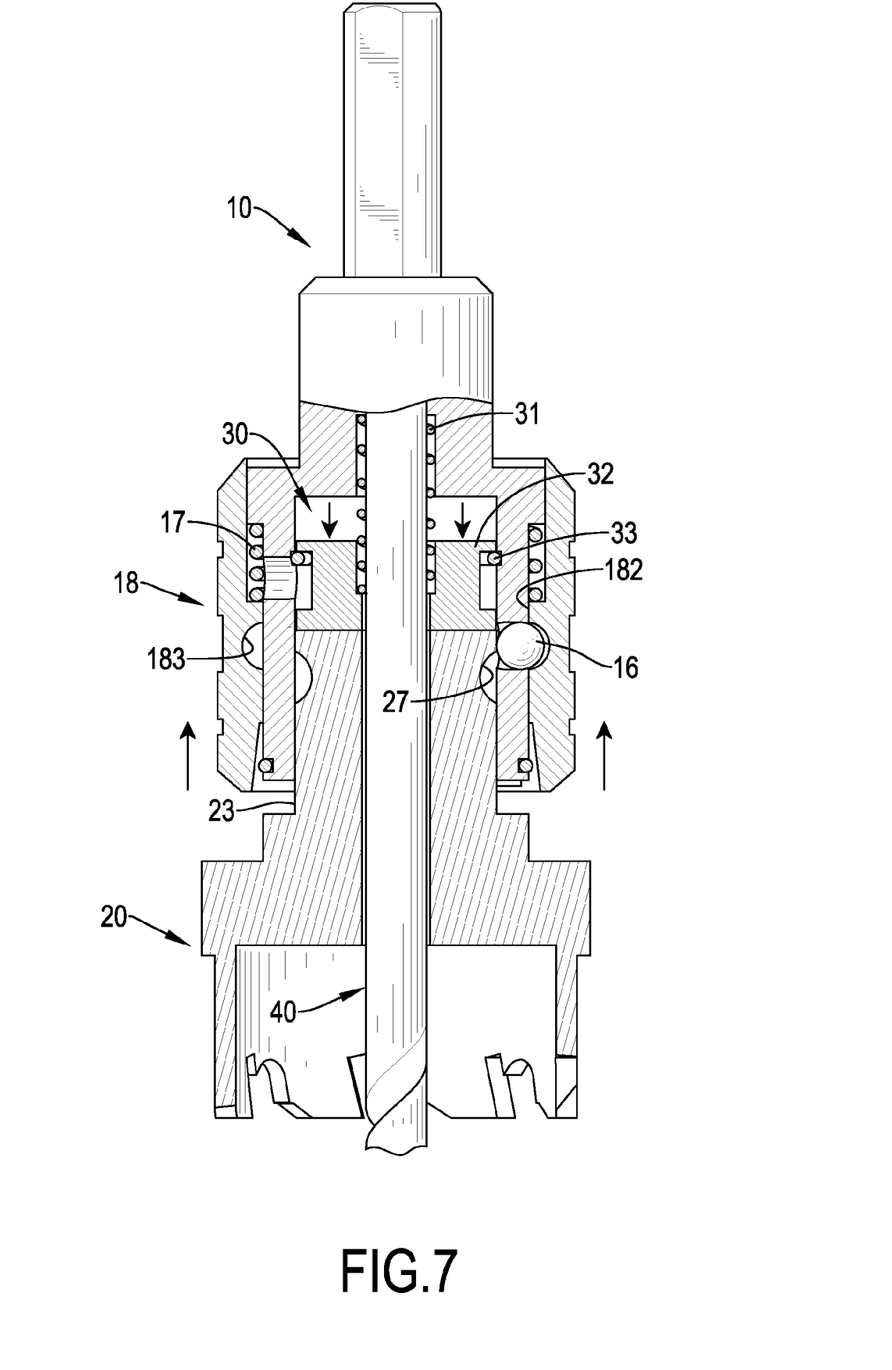
FIG. 7 is an operational side view in partial section of the cutter assembly in FIG. 1 showing that the outer collar is moved upward and the head is pushed by the pushing block and detached from the adapter.

After a new head 20 with a saw 22 of different size or shape is inserted into the inserting hole 12, the outer collar 18 is released and moves downward by the force provided by the recoil spring 17. With the downward movement of the outer collar 18, the balls 16 will be pushed to move into the engaging groove 27 in the new head 20 by the annular protrusion 182. Thus, the head 20 is locked and held on the adapter 10 by the balls 16. To rotate the outer collar 18 in reverse, the positioning rod 185 will enter into the limiting segment 1330 of the guiding slot 133 to keep the outer collar 18 to move upward relative to the adapter 10. Therefore, the head 20 can be kept from detaching from the adapter 10 unintentionally, a safety effect is provided.

Furthermore, a single adapter 10 of the cutter assembly in accordance with the present can be assembled with multiple heads 20 with saws 22 in different sizes or shapes, so the cutter assembly is versatile in use and the space and cost for storage and use of the cutter assembly can be effectively reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutter assembly comprising:
an adapter having
two ends
a connecting rod formed on one end of the adapter;
an inserting hole defined in the other end of the adapter opposite to the connecting rod;
a sleeve segment formed around the inserting hole and having an outer surface;
a guiding slot defined in the outer surface of the sleeve segment and comprising
a limiting segment formed laterally in the outer surface of the sleeve segment; and
a sliding segment formed longitudinally in the outer surface of the sleeve segment and connected and communicating with the limiting segment;
multiple ball holes defined through the outer surface of the sleeve segment and communicating with the inserting hole, and each ball hole being conical and having a minimum diameter;
multiple balls mounted respectively in the ball holes, and each ball having a maximum diameter larger than the minimum diameter of a corresponding one of the ball holes; and
at least one holding tab formed on and protruding from the adapter at the end in which the inserting hole is defined;
an outer collar slidably and rotatably mounted around the sleeve segment of the adapter and having
an inner surface;
an annular protrusion formed on and protruding from the inner surface of the outer collar and selectively abutting against the balls;
an annular escaping recess formed in the inner surface of the outer collar adjacent to the annular protrusion and selectively aligning with the ball holes; and
a positioning rod mounted on the outer collar and extending slidably into the guiding slot;
a recoil spring mounted between the adapter and the outer collar and mounted around the sleeve segment of the adapter;
a holding ring mounted around the sleeve segment of the adapter and abutting the outer collar to hold the outer collar on the sleeve segment of the adapter; and
a head mounted detachably on the adapter and comprising
two ends;
a saw formed around one of the ends of the head; and
an inserting rod formed on and protruding from the other end of the head, inserted into the inserting hole in the adapter and having
an annular engaging groove formed around the inserting rod at a position corresponding to the balls to selectively hold the balls in the engaging groove; and
at least one holding surface formed on the inserting rod and abutting respectively the at least one holding tab on the adapter, wherein
the inserting hole and the inserting rod on the head are round in cross section;
the adapter further has a central hole defined in the adapter and co-axially communicating with the inserting hole;
the head further has a central through hole defined axially through the head;
a central drill is mounted through the central through hole in the head and extends into the central hole in the adapter via the inserting hole; and
the cutter assembly further comprises a pushing assembly mounted between the adapter and the head and comprising a pushing block mounted moveably in the inserting hole, abutting the head, and having a central hole defined through the pushing block, wherein the central drill is mounted through the central hole of the pushing block;

a pushing spring mounted around the central drill and having two ends abutting respectively the adapter and the pushing block; and a limiting ring mounted the inserting around the pushing block to provide a limiting effect to a movement range of the pushing block.

2. The cutter assembly as claimed in claim 1, wherein
the adapter has an enlarged hole formed on an end of the central hole that is adjacent to the inserting hole;
the pushing block has an enlarged hole formed in a side of the pushing block facing the central hole in the adapter; and
the two ends of the pushing spring are mounted respectively in the enlarged holes of the adapter and the pushing block.

3. The cutter assembly as claimed in claim 2, wherein
the adapter further has an annular ring groove defined in an inner surface of the inserting hole;
the pushing block further comprises an annular limiting recess defined around the pushing block; and
the limiting ring of the pushing assembly is mounted in and protrudes from the ring groove and extends partially in the limiting recess of the pushing block.

4. The cutter assembly as claimed in claim 3, wherein the adapter further has a threaded hole defined radially in the adapter, communicating with the central hole in the adapter and abutting against the central drill.

5. The cutter assembly as claimed in claim 4, wherein
the adapter further has a flange formed around the sleeve segment and having an outer diameter larger than an outer diameter of the sleeve segment;
the outer collar has a holding hole defined in the outer collar and having an inner diameter larger than an outer diameter of the recoil spring and the outer diameter of the flange on the adapter; and
the recoil spring has two ends abutting respectively flange and the annular protrusion on the outer collar.

6. The cutter assembly as claimed in claim 5, wherein the outer collar has an engraved outer surface.

7. The cutter assembly as claimed in claim 1, wherein the adapter further has a threaded hole defined radially in the adapter, communicating with the central hole in the adapter and abutting against the central drill.

8. The cutter assembly as claimed in claim 7, wherein
the adapter further has a flange formed around the sleeve segment and having an outer diameter larger than an outer diameter of the sleeve segment;
the outer collar has a holding hole defined in the outer collar and having an inner diameter larger than an outer diameter of the recoil spring and the outer diameter of the flange on the adapter; and
the recoil spring has two ends abutting respectively flange and the annular protrusion on the outer collar.

9. The cutter assembly as claimed in claim 8, wherein the outer collar has an engraved outer surface.

10. The cutter assembly as claimed in claim 1, wherein
the adapter further has a flange formed around the sleeve segment and having an outer diameter larger than an outer diameter of the sleeve segment;
the outer collar has a holding hole defined in the outer collar and having an inner diameter larger than an outer diameter of the recoil spring and the outer diameter of the flange on the adapter; and
the recoil spring has two ends abutting respectively flange and the annular protrusion on the outer collar.

11. The cutter assembly as claimed in claim 10, wherein the outer collar has an engraved outer surface.

* * * * *